United States Patent
Jiang et al.

(10) Patent No.: US 6,541,175 B1
(45) Date of Patent: Apr. 1, 2003

(54) TONER PROCESSES

(75) Inventors: Lu Jiang, Oakville (CA); Walter Mychajlowskij, Mississauga (CA); Guerino G. Sacripante, Oakville (CA); Raj D. Patel, Oakville (CA); Michael A. Hopper, Toronto (CA)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 10/062,129

(22) Filed: Feb. 4, 2002

(51) Int. Cl.[7] ............ G03G 9/08; C08J 3/215
(52) U.S. Cl. ............ 430/137.14; 523/335
(58) Field of Search ............ 430/137.14; 523/333, 523/335

(56) References Cited

U.S. PATENT DOCUMENTS

| | | | |
|---|---|---|---|
| 4,558,108 A | 12/1985 | Alexandru et al. | 526/340 |
| 4,797,339 A | 1/1989 | Maruyama et al. | 430/109 |
| 4,983,988 A | 1/1991 | Tan et al. | 430/137 |
| 4,996,127 A | 2/1991 | Hasegawa et al. | 430/109 |
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,344,738 A | 9/1994 | Kmiecik-Lawrynowicz et al. | 430/137 |
| 5,370,963 A | 12/1994 | Patel et al. | 430/137 |
| 5,403,693 A | 4/1995 | Patel et al. | 430/137 |
| 5,858,601 A | 1/1999 | Ong et al. | 435/137 |
| 5,945,245 A | 8/1999 | Mychajlowskij et al. | 430/137 |
| 5,977,210 A | 11/1999 | Patel et al. | 523/161 |
| 6,140,003 A | 10/2000 | Sacripante et al. | 430/110 |
| 6,210,853 B1 * | 4/2001 | Patel et al. | 430/137 |
| 6,352,810 B1 * | 3/2002 | Jiang et al. | 430/137.14 |
| 6,432,601 B1 * | 8/2002 | Foucher et al. | 430/109.4 |
| 6,495,302 B1 * | 12/2002 | Jiang et al. | 430/137.1 |

* cited by examiner

Primary Examiner—John Goodrow
(74) Attorney, Agent, or Firm—E. O. Palazzo

(57) ABSTRACT

A process involving, for example, providing or generating an emulsion latex comprised of sodio sulfonated polyester resin particles by adding with shearing to the latex a colorant dispersion comprising from about 20 to about 50 percent of a predispersed colorant in water, followed by the addition of an organic or an inorganic acid; heating the resulting mixture at a temperature of from about 45° C. to about 65° C. followed by the addition of an water insoluble metal salt or water insoluble metal oxide thereby releasing metal ions and permitting aggregation and coalescence, resulting in toner particles; and optionally cooling the mixture and isolating the product.

30 Claims, No Drawings

TONER PROCESSES

CROSS REFERENCE

Illustrated in U.S. Pat. No. 5,945,245, the disclosure of which is totally incorporated herein by reference, is a process for the preparation of toner compositions comprising, for example, (i) preparing an emulsion latex comprised of sodio sulfonated polyester resin particles of from about 5 to about 500 nanometers in size diameter by heating the particle in water at a temperature of from about 65° C. to about 90° C.;

(ii) preparing a pigment dispersion in water by dispersing in water from about 10 to about 25 weight percent of a sodio sulfonated polyester and from about 1 to about 5 weight percent of pigment;

(iii) adding the pigment dispersion to a latex mixture comprised of sulfonated polyester resin particles in water with shearing, followed by the addition of an alkali halide in water until aggregation results as indicated by an increase in the latex viscosity of from about 2 centipoise to about 100 centipoise;

(iv) heating the resulting mixture at a temperature of from about 45° C. to about 55° C. thereby causing further aggregation and enabling coalescence, resulting in toner particles of from about 4 to about 9 microns in volume average diameter and with a geometric distribution of less than about 1.3; and optionally (v) cooling the product mixture to about 25° C. followed by washing and drying.

The process of the above patent may be disadvantageous in that, for example, the use of an alkali metal may result in a final toner resin which evidences some crosslinking or elastic reinforcement, primarily since the metal salt functions as a crosslinked site between the sulfonate groups contained on the polyester resin, causing an increase in viscosity and a decrease, or loss of high gloss characteristics for the polyester resin. These and other disadvantages and problems are minimized, or avoided with the processes of the present invention.

BACKGROUND OF THE INVENTION

The present invention is generally directed to toner processes, and more specifically, to aggregation and coalescence processes for the preparation of toner compositions. In embodiments, the present invention is directed to the economical chemical in situ preparation of toners without the utilization of the known pulverization and/or classification methods, and wherein in embodiments toner compositions with a volume average diameter of from about 1 to about 25, and specifically from 1 to about 10 microns and narrow GSD of, for example, from about 1.14 to about 1.25 as measured on the Coulter Counter can be obtained. The resulting toners can be selected for known electrophotographic imaging, digital, printing processes, including color processes, and lithography.

In embodiments, the present invention is directed to a substantial free surfactant process comprised of forming a latex of a polyester, such as a sodium sulfonated polyester resin, in water, mixing the latex with a colorant, especially pigment dispersion containing coagulating metal ions resulting from water insoluble metal salt or oxides in the presence of an inorganic or an organic acid, and thereafter, heating the resulting mixture to primarily enable the generation of toner aggregates and coalesced toner particles. The polyester resin selected specifically contains sulfonated groups thereby rendering them dissipatable, that is, they form spontaneous emulsions in water without the use of organic solvents, above the glass transition temperature, Tg, of the polyester resin. The process of the present invention can be considered a surfactant free chemical method wherein sulfopolyester particles in the presence of a colorant dispersion are aggregated and coalesced with water and insoluble metal salts or oxides in the presence of an inorganic or an organic acids which salts and acids slowly react to release metal ion flocculents. The reaction between the water insoluble metal salts or oxides in the presence of an acid permits the controlled release of flocculent, since the metal salts or oxides being substantially insoluble in water are well dispersed in the aqueous phase of the sulfonated polyester emulsion and react with the acid slowly to give rise to metal ions, and wherein during the heating no surfactants are utilized. Heating the mixture at temperatures of from about 45° C. to about 55° C. generates toner size particles with, for example, an average particle volume diameter of from about 1 to about 25, and specifically about 2 to about 10 microns. It is believed that during the heating the components of the sulfonated polyester latex and the colorant dispersion aggregate and fuse together to form composite toner particles.

In specific embodiments, the present invention is directed to an in situ process comprised of first dispersing a colorant like a pigment, such as HELIOGEN BLUE™ or HOSTAPERM PINK™, reference the Color Index, in an aqueous mixture utilizing a high shearing device, such as a Brinkmann Polytron, microfluidizer or sonicator, thereafter shearing this mixture with a latex of suspended polyester resin particles, andi which particles are specifically, for example, of a size of from about 5 to about 500, and specifically, about 10 to about 250 nanometers in volume average diameter as measured by a Brookhaven nanosizer. Thereafter, the aforesaid mixture is contacted with a metal ion complexing agent, resulting from the reaction between a metal salt or metal oxide with an inorganic or organic acid and heated with stirring for a suitable time period of, for example, at a temperature of from about 1 to about 8 hours, and which heating is, for example, at a temperature of from about 40° C. to about 60° C., and specifically from about 45° C. to about 55° C., thereby resulting in the simultaneous aggregation and coalescence of the resin particles with the colorant, and permitting the formation of particles in a size of from about 0.5 micron to about 20 microns, and specifically from about 2 to about 10 microns in average diameter size as measured by the Coulter Counter (Microsizer II). The size of the coalesced particles and their distribution can be controlled by, for example, the amount of the metal ions resulting from the addition of water insoluble metal salts or oxides in presence of an acid and by the heating temperature, and wherein the speed at which toner size particles are formed can be controlled by the quantity of coagulant complexing agent used and by the temperature. The metal salts or oxides are insoluble or substantially insoluble in water, but are readily dispersible in water, the reaction between the acid and the metal salt or metal oxide allows a controlled flocculent release of metal ions in the latex emulsion colorant mixture. The particles obtained after heating can be subjected to washing with, for example, water to remove residual salts or ions and drying whereby toner particles comprised of resin and colorant, and which toner can be of various particle size diameters, such as from 1 to about 20, and specifically about 12 microns in volume average particle diameter. The aforementioned toners are especially useful for the development of colored images with excellent line and solid resolution, and wherein substantially no background deposits are present.

In reprographic technologies, such as xerographic and ionographic devices, toners with volume average diamreter particle sizes of from about 9 microns to about 20 microns are effectively utilized. Moreover, in xerographic technologies, such as in the high volume Xerox Corporation 5090 copier-duplicator, high resolution characteristics and low image noise are highly desired, and can be attained utilizing the small sized toners of the present invention with, for example, a volume average particle diameter of from about 2 to about 11 microns and specifically less than about 7 microns, and with a narrow geometric size distribution (GSD) of from about 1.16 to about 1.3. Additionally, in xerographic systems wherein process color is utilized, such as pictorial color applications, small particle size colored toners, specifically of from about 3 to about 9. microns, are desired to avoid paper curling. Also, it is preferable to select small toner particle sizes, such as from about 1 to about 7 microns, and with higher colorant loading, such as from about 5 to about 12 percent by weight of toner, such that the mass of toner layers deposited onto paper is reduced to obtain the same quality of image and resulting in a thinner plastic toner layer on paper after fusing, thereby minimizing or avoiding paper curling. Toners prepared in accordance with the present invention enable in embodiments the use of lower image fusing temperatures, such as from about 120° C. to about 150° C., thereby avoiding or minimizing paper curl. Lower fusing temperatures minimize the loss of moisture from paper, thereby reducing or eliminating paper curl. Furthermore, in process color applications, and especially in pictorial color applications, toner to paper gloss matching is highly desirable. Gloss matching refers to matching the gloss of the toner image to the gloss of the paper. For example, when a low gloss image of from about 1 to about 30 gloss is desired, low gloss paper is utilized, such as from about 1 to about 30 gloss units as measured by the Gardner Gloss metering unit, and which after image formation with small particle size toners, specifically of from about 3 to about 5 microns and fixing thereafter, results in a low gloss toner image of from about 1 to about 30 gloss units as measured by the Gardner Gloss metering unit. Alternatively, when higher image gloss is desired, such as from about 30 to about 60 gloss units as measured by the Gardner Gloss metering unit, higher gloss paper is utilized, such as from about 30 to about 60 gloss units, and which after image formation with small particle size toners of the present invention of, for example, from about 3 to about 5 microns, and fixing thereafter results in a higher gloss toner image of from about 30 to about 60 gloss units as measured by the Gardner Gloss metering unit. The aforementioned toner to paper matching can be attained, for example, with small particle size toners, such as less than about 7 microns or less than about 5 microns, such as from about 1 to about 4 microns, whereby the pile height of the toner layer or layers is considered low and acceptable.

REFERENCES

Numerous processes are known for the preparation of toners, such as, for example, conventional polyester processes wherein a resin is melt kneaded or extruded with a pigment, micronized and pulverized to provide toner particles with a volume average particle diameter of from about 9 microns to about 20 microns and with broad geometric size distribution of from about 1.26 to about 1.5. In these processes, it is usually necessary to subject the aforementioned toners to a classification procedure such that the geometric size distribution of from about 1.2 to about 1.4 is attained. Also, in the aforementioned conventional process, low toner yields after classifications may be obtained. Generally, during the preparation of toners with average particle size diameters of from about 11 microns to about 15 microns, toner yields are from about 70 percent to about 85 percent after classification. Additionally, during the preparation of smaller sized toners with particle sizes of from about 7 microns to about 11 microns, lower toner yields can be obtained after classification, such as from about 50 percent to about 70 percent. With the processes of the present invention in embodiments, small average particle sizes of, for example, from about 3 microns to about 9 microns, and more specifically 5 microns are attained without resorting to classification processes, and wherein narrow geometric size distributions are attained, such as from about 1.16 to about 1.30, and more specifically from about 1.16 to about 1.25. High toner yields are also attained such as from about 90 percent to about 98 percent in embodiments of the present invention. In addition, by the toner particle preparation process of the present invention in embodiments, small particle size toners of from about 3 microns to about 7 microns can be economically prepared in high yields, such as from about 90 percent to about 98 percent by weight based on the weight of all the toner ingredients, such as toner resin and colorant.

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. The disadvantage, for example, of poor GSD requires classification resulting in low toner yields, reference for example U.S. Pat. No. 4,797,339, wherein there is disclosed a process for the preparation of toners by resin emulsion polymerization, wherein similar to the '127 patent certain polar resins are selected, and wherein flocculation as in the present invention is not believed to be disclosed; and U.S. Pat. No. 4,558,108, wherein there is disclosed a process for the preparation of a copolymer of styrene and butadiene by specific suspension polymerization.

In U.S. Pat. No. 5,290,654, the disclosure of which is totally incorporated herein by reference, there is illustrated a process for the preparation of toners comprised of dispersing a polymer solution comprised of an organic solvent and a polyester, and homogenizing and heating the mixture to remove the solvent and thereby form toner composites.

Emulsion/aggregation/coalescing processes for the preparation of toners are illustrated in a number of Xerox patents, the disclosures of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797. Also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,910,387; 5,919,595; 5,916,725; 5,902,710; 5,863,698,5,925,488; 5,977,210 and 5,858,601.

SUMMARY OF THE INVENTION

It is a feature of the present invention to provide toner processes with many of the advantages illustrated herein.

In another feature of the present invention there are provided simple and economical processes for the preparation of black and colored toner compositions with, for example, excellent colorant dispersion and narrow GSD.

In another feature of the present invention there are provided simple and economical in situ substantially surfactant free processes for black and colored toner compositions by an emulsion aggregation process, and wherein a sulfonated polyester is selected as the resin, reference copending U.S. Pat. No. 6,140,003, the disclosure of which is totally incorporated herein by reference.

In a further feature of the present invention there is provided a process for the preparation of sulfonated polyester containing toner compositions with an average particle volume diameter of from about 1 to about 10 microns, and more specifically, from about 2 to about 7 microns, and with a narrow GSD of from about 1.15 to about 1.25, and more specifically, from about 1.16 to about 1.22 as measured by a Coulter Counter.

In a further feature of the present invention there is provided a process in which the metal ions resulting from the reaction between dispersed water insoluble metal salts or oxides with an acid are released in a controlled manner into the sulfonated polyester emulsion containing a colorant to provide aggregates which are then coalesced to provide pigmented toner size particles.

In a further feature of the present invention there is provided a process for the preparation of toner compositions with certain effective particle sizes by controlling the temperature of the aggregation/coalescence, which process comprises stirring and heating at a suitable aggregation/coalescence temperature.

Also, in another feature of the present invention, there is provided a process for the preparation of toners with particle size distribution which can be improved from about 1.4 to about 1.16 as measured by the Coulter Counter by increasing the temperature of aggregation/coalescence from about 25° C. to about 60° C. and more specifically from about 45° C. to about 55° C.

Other features of the present invention involve providing a toner process that is rapid since, for example, the aggregation/coalescence time can be reduced to from about 1 to about 3 hours by increasing the temperature from room, about 25° C., (RT) to about 50° C. to about 60° C., and wherein the process consumes from about 1 to about 8 hours; providing an economical process for the preparation of toner corrmpositions which after fixing to paper substrates results in images with a gloss of from 20 GGU (Gardner Gloss Units) up to 70 GGU as measured by Gardner Gloss meter matching of toner and paper; providing a composite toner of polymeric resin colorant, and optional charge control agent in high yields of from about 90 percent to about 100 percent by weight of toner without resorting to classification, and wherein surfactants are substantially avoided; processes for dissipating a polar charged sodium sulfonated polyester (SPE) resin in water at about 10° C. to about 25° C. above the Tg of the polyester to form an emulsion latex, followed by mixing with colorant in the presence of an acid, and thereafter heating the mixture to from about 30° C. to about 65° C. and more specifically from about 45° C. to about 55° C. resulting in metal ions generated from the reaction between the salt and the acid to effect aggregation/coalescence of the emulsion particles and colorant to form coalesced toner particles of resin and colorant; providing toner compositions with low fusing temperatures of from about 110° C. to about 150° C. and with excellent blocking characteristics at from about 50° C. to about 60° C.; providing metal ions in an emulsion in the presence of a colorant in a controlled manner which eliminates reactor fouling since coagulant metal ions are available in small quantities throughout the entire mixture due to the reaction of the water insoluble metal salt and the acid; and a substantial surfactant free process, thereby reducing or eliminating extensive washings.

Aspects of the present invention relate to a process comprising (i) providing or generating an emulsion latex comprised of sodio sulfonated polyester resin particles by heating the particles in water at a temperature of from about 65° C. to about 90° C;

(ii) adding with shearing to the latex (i) a colorant dispersion comprising from about 20 to about 50 percent of a predispersed colorant in water, followed by the addition of an organic or an inorganic acid;

(iv) heating the resulting mixture at a temperature of from about 45° C. to about 65° C., followed by the addition of, a water insoluble metal salt or water insoluble metal oxide thereby releasing metal ions and permitting aggregation and coalescence resulting in toner particles of from about 3 to about 15 microns in volume average diameter, and with an optional geometric distribution of less than about 1.25; and optionally (v) cooling the mixture and isolating a toner product; a process wherein the insoluble metal salt is added to the blend of the emulsion, colorant, and acid to initiate the formation of metal salts which act as coagulating agents at the aggregating and coalescence temperature; a process wherein simultaneous aggregation and coalescence is accomplished; a process wherein the aggregation and coalescence temperature is from about 50° C. to about 65° C.; a process wherein the insoluble metal salt or metal oxide is $MgCO_3$, $SrCO_3$, $MnCO_3$, $CaCO_3$, $BaCo_3$, $ZnCO_3$, $MgC_2O_4$, $CoC_2O_4$, $CaC_2O_4$, $ZnC_2O_4$ and insoluble oxides such as $ZnO$, $Mn_2O$, $Bi_2O_3$ or $Mn_2O$, $Ce_2O_3$, $B_2O_3$ and $Ce_2O_3$; a process wherein the inorganic acid is selected from the group consisting of hydrochloric acid, nitric acid, sulfuric acid, and phosphoric acid, and the organic acid is selected from the group consisting of citric acid and acetic acid; a process wherein the concentration of the metal ions, which ions function primarily as a flocculating agent, is from about 0.5 to about 10 percent by weight, or from about 1 to about 7.5 percent by weight of the amount of the resin; a process wherein the addition of the insoluble metal salt or metal oxide results in finely dispersed particles in the emulsion/colorant mixture of (iv), wherein the fine particles react with the acid forming a metal ion, which metal ions function as a coagulant; a process wherein the flocculating metal ion is released in a controlled manner at elevated temperatures of about 50° C. to about 65° C.; a process wherein the controlled release of the flocculating metal ions allows for an increase in the reactor throughput from about 12 to about 22 percent; a process wherein the particle size distribution of the aggregated particles is about 1.40 decreasing to about 1.15 microns when the temperature is increased from room temperature, about 25° C. to about 55° C.; a process wherein the shearing is accomplished by homogenizing at from about 1,000 revolutions per minute to about 10,000 revolutions per minute, at a temperature of from about 25° C. to about 35° C., and for a duration of from about 1 minute to about 120 minutes; a process wherein the polyester (i) is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylene-sodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate); a process wherein the polyester of (i) is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylenesodio 5-sulfoisophthalate)-copoly-(1,2-propylene-diethylene-terephthalate phthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate); a process wherein the colorant is carbon black, magnetite, cyan, yellow, magenta, or mixtures thereof; a process wherein the toner particles isolated are from about 2 to about 15 microns in volume average diameter, and the geometric size distribution thereof is from about 1.15 to about 1.35; a process wherein there is added to the surface of the formed toner metal salts, metal salts of fatty acids, silicas, metal oxides, or mixtures thereof, each in an amount of from about 0.1 to about 10 weight percent of the obtained toner; a process wherein the toner obtained after cooling is from about 2 to about 25 microns in volume average diameter, and the geometric size distribution thereof is from about 1.15 to about 1.25; a substantially surfactant free process for the preparation of toner comprising admixing an emulsion latex comprised of sodio sulfonated polyester resin particles of equal or less than about 0.1 micron in diameter size by heating the resin in water at a temperature of from about 15° C. to about 30° C. above the resin glass transition temperature with a colorant dispersion containing from about 20 to about 50 percent of predispersed colorant in water with a mean colorant diameter size of from about 50 to about 150 nanometers, followed by the addition of an inorganic or an organic acid, followed by heating the resulting mixture at a temperature of from about 35° C. to about 65° C. followed by the addition of an insoluble metal salt or metal oxide in the presence of the acid resulting in a reaction of the salt or oxide to form metal ions, which function as coagulating agents, thereby simultaneously causing aggregation and coalescence and (v) cooling the mixture; a process wherein there is prepared an emulsion latex comprised of the sodio sulfonated polyester resin particles by heating the resin in water; a process wherein isolation is by filtration and cooling is to about 25° C.; a process wherein subsequent to (iv) the toner compositions or particles resulting are (v) cooled to about 25° C., followed by washing and drying; a process wherein an organic acid is selected; a process wherein an inorganic acid is selected; a process wherein a metal oxide is selected; a process wherein the oxide is zinc oxide or magnesium oxide and the ions are zinc two or magnesium two; a process comprising blending an emulsion latex with a colbrant dispersion in the presence of an organic acid; heating the resulting mixture; adding a metal salt, and optionally cooling and isolating the product; a process wherein the latex contains a sodium sulfonated polyester polymer or a resin with an optional volume average diameter of from about 5 to about 300 nanometers, wherein the heating is from about 45° C. to about 65° C., wherein the metal salt, which reacts with the organic acid, causes the release of metal ions, wherein cooling and isolating is accomplished, wherein the product is a toner and wherein the organic acid is substantially insoluble in an organic solvent; a process wherein the blending and heating is accomplished in a reactor and wherein reactor fouling is minimized; processes for the preparation of toner compositions, which comprise initially attaining or generating a colorant, such as a pigment dispersion, by, for example, dispersing an aqueous mixture of a colorant like pigment or pigments, such as carbon black like REGAL 330® obtained from Cabot Corporation, phthalocyanine, quinacridone or RHODAMINE B™, and generally cyan, magenta, blue, yellow, or mixtures thereof, thereafter shearing this mixture by utilizing a high shearing device, such as a Brinkmann Polytron, a sonicator or microfluidizer with a suspended resin mixture comprised of a sulfonated polyester polymer component, adding metal ions resulting from a reaction between dispersed water insoluble metal salts or metal oxides, which in the presence of an acid are released in a controlled manner, and subsequently further heating to enable aggregation/coalescence; a process comprising (i) preparing an emulsion latex comprised of sodio sulfonated polyester resin particles of from about 5 to about 300 nanometers, and more specifically, 10 to about 150 nanometers in size diameter by heating the resin in water at a temperature of from about 65° C. to about 90° C.;

(ii) adding with shearing a colorant dispersion containing from about 20 to about 50 percent of predispersed colorant in water, which colorant possesses a mean colorant size of from about 50 to about 150 nanometers to the latex (i) mixture, followed by the addition of an organic or optionally an inorganic acid;

(iii) heating the resulting mixture at a temperature of from about 45° C. to about 65° C. followed by the addition of a water insoluble metal salt or oxide thereby resulting in a reaction to release metal ions in a controlled manner, causing aggregation and enabling coalescence, resulting in toner particles of from about 3 to about 9 microns in volume average diameter, and with a geometric distribution of less than about 1.25; and optionally (iv) cooling the toner product mixture and followed by isolation, and drying; a process comprising
(i) preparing an emulsion latex comprised of sodio sulfonated polyester resin particles of from about 5 to about 300 nanometers, and more specifically, about 10 to about 250 nanometers in diameter and present in an amount of from about 5 to about 40 weight percent by heating the resin in water at a temperature of from about 45° C. to about 80° C.;
(ii) adding with shearing a pigment dispersion containing about 20 to about 50 percent of predispersed pigment in water with a mean pigment size of from about 50 to about 150 nanometers to the latex mixture comprised of sulfonated polyester resin particles in water followed by the addition of an organic or optionally an inorganic acid;
(iii) heating the resulting mixture at a temperature of from about 35° C. to about 60° C., and more specifically, from about 45° C. to about 55° C., followed by the addition of water insoluble metal salts or metal oxides resulting from the reaction of dispersed water insoluble metal salts or oxides, which in the presence of an acid are released in a controlled manner wherein the amounts of the metal ions are from about 0.5 to about 10 weight percent in water, and more specifically, in about 1 to about 7.5 weight percent in water, thereby causing aggregation and coalescence resulting in toner particles, for example, of from about 4 to about 9 microns in size; and
(iv) cooling the product mixture to about 25° C., followed by filtering and drying;
(iv) cooling the product mixture to about 25° C. and followed by filtering and drying;
and a surfactant free process comprising
(i) preparing an emulsion latex comprised of sodio sulfonated polyester resin particles by heating the resin in water;
(ii) adding a colorant dispersion to the latex mixture comprised of sulfonated polyester resin particles, which dispersion contains an acid, followed by heating to a temperature of about 45° C. to about 55° C. to which is added a water insoluble metal salt or an oxide resulting in a reaction between the salt and the acid to form metal ions resulting in aggregation thereby enabling the formation of toner particles, and wherein the metal ion concentration is of from about 1.0 to about 7.5 weight percent in water.

In some instances, colorants, such as pigments, available in the wet cake form or concentrated form containing water can be easily dispersed utilizing a homogenizer or stirring. Pigments are also available in a dry form, whereby dispersion in water can be effected by microfluidizing using, for example, a M-110 microfluidizer and passing the pigment dispersion from about 1 to about 10 times through the chamber of the microfluidizer, or by sonication, such as using a Branson 700 sonicator.

Examples of sulfonated polyesters selected include those as illustrated in copending application U.S. Pat. No. 6,140,003, the disclosure of which is totally incorporated herein by reference, such as a sodio sulfonated polyester, and more specifically, a polyester, such as poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylene-sodio 5-sulfoisophthalate)-copoly-(1,2-propylene-diethylene-terephthalate-phthalate), copoly-(ethylene-neopentylene-sodio 5-sulfoisophthalate)-copoly-(ethylene-neopentylene-terephthalate-phthalate), and copoly-(propoxylated bisphenol A)-copoly-(propoxylated bisphenol A-sodio 5-sulfoisophthalate). The sulfonated polyesters may in embodiments sented by the following formula

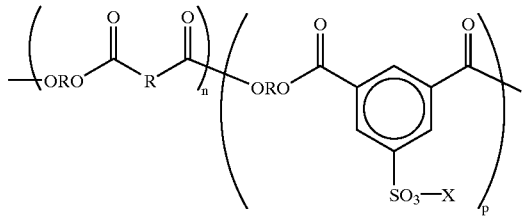

wherein R is an alkylene of from about 2 to about 25 carbon atoms, such as ethylene, propylene, butylene, or oxyalkylene diethyleneoxide, and the like; R' is an arylene of from about 6 to about 36 carbon atoms, such as a benzylene, bisphenylene, bis(alkyloxy) bisphenolene, and the like, and represents the number of segments. The alkali sulfopolyester has a number average molecular weight ($M_n$) of from about 1,500 to about 50,000 grams per mol, a weight average molecular weight ($M_w$) of from about 6,000 grams per mol to about 150,000 grams per mol as measured by gel permeation chromatography and using polystyrene as standards.

Various known colorants or pigments present in the toner in an effective amount of, for example, from about 1 to about 25 percent by weight of the toner, and more specifically, in an amount of from about 1 to about 15 weight percent, that can be selected include carbon black like REGAL 330°; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™, Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include cdpper tetra(octadecyl sulfonamido) phthalocyanine, x-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, especially pigments selected are present in various effective amounts, such as from about 1 weight percent to about 65 weight and specifically from about 2 to about 12 percent, of the toner. Colorants, include dyes, pigments, mixtures thereof, mixtures of pigments, mixtures of dyes, and the like.

The toner may also include known charge additives in effective amounts of, for example, from 0.1 to 5 weight percent such as alkyl pyridinium halides, bisulfates, the charge control additives of U.S. Pat. Nos. 3,944,493; 4,007, 293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Examples of water insoluble metal salts or components include magnesium carbonate, $SrCO_3$, $MnCO_3$, $CaCO_3$, $BaCO_3$, $ZnCO_3$, $MgC_2O_4$, $CoC_2O_4$, $CaC_2O_4$, $ZnC_2O_4$ and examples of insoluble oxides are $ZnO$, $Mn_2O$, $Bi_2O3$ $Ce_2O_3$, and the like. Examples of the acids are hydrochloric acid, nitric acid, sulfuric acid, phosphoric acid, citric acid, acetic acid, oxalic acid, tartaric acid and the like. An effective concentration of the metal ions flocculating agent is in embodiments, for example from about 0.5 to about 10 percent by weight, and more specifically from about 1 to about 7.5 percent by weight of the amount of the sulfonated polyester resin.

Surface additives that can be added to the toner compositions after washing or drying include, for example, metal salts, metal salts of fatty acids, colloidal silicas, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa in amounts of from 0.1 to 2 percent which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,660, the disclosure of which is totally incorporated herein by reference.

The following Examples are being submitted to further define various species of the present invention. These Examples are intended to be illustrative only and are not intended to limit the scope of the present invention. Also, parts and percentages are by weight unless otherwise indicated.

EXAMPLE I

Preparation of Sulfonated Polyesters

Moderately sulfonated polyesters prepared by polycondensation were selected with a sufficient enough loading of sulfonate groups to afford ready dissipation of the polymer in warm water (5 to 10° C.>than the Tg of the polyester) to enable submicron particles.

Preparation of Linear Moderately Sulfonated Polyester:

A linear sulfonated random copolyester resin comprised of, on a mol percent, approximately 0.465 of terephthalate, 0.035 of sodium sulfoisophthalate, 0.475 of 1,2-propanediol, and 0.025 of diethylene glycol was prepared as follows. In a one liter Parr reactor equipped with a bottom drain valve, double turbine agitator, and distillation receiver with a cold water condenser were charged 388 grams of dimethylterephthalate, 44.55 grams of sodium dimethylsulfoisophthalate, 310.94 grams of 1,2-propanediol (1 mol excess of glycol), 22.36 grams of diethylene glycol (1 mol excess of glycol), and 0.8 gram of butyltin hydroxide oxide as the catalyst. The reactor was then heated to 165° C. with stirring for 3 hours whereby 115 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with the collection of approximately 122 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 16 grams of 1,2-propanediol were collected. The reactor was then purged with nitrogen to atmospheric pressure, and the polymer discharged through the bottom drain onto a container cooled with dry ice to yield 460 grams of the 3.5 mol percent sulfonated-polyester resin, copoly(1,2-propylene-diethylene)terephthalate-copoly (sodium sulfoisophthalate dicarboxylate). The sulfonated-polyester resin glass transition temperature was measured to be 59.5° C. (onset) utilizing the 910 Differential Scanning Calorimeter available from E.I. DuPont operating at a heating rate of 10° C. per minute. The number average molecular weight was measured to be 3,250 grams per mole, and the weight average molecular weight was measured to be 5,290 grams per mol using tetrahydrofuran as the solvent. A particle size diameter of 57 nanometers (volume weighted) for the polyester product was measured using a Nicomp particle sizer.

Preparation of Latex Stock Solutions:

Submicron dispersions of a sulfonated polyester in distilled deionized water were prepared by first heating the water to about 10° C. to about 15° C. above the glass transition of the sulfonated polyester polymer and then slowly adding the polymer with stirring until it has fully dispersed. The latexes formed processed a characteristic blue tinge and particle sizes of from about 5 to about 100 nanometers. Stock solutions are stable indefinitely. In general, 50 grams of sulfonated polyester were dissipated in 200 grams of water.

Cyan Toner Preparation:

192 Grams of the sulfonated polyester resin SPE-1 were dissipated in 768 grams of hot (60 to 70° C.) water. The resulting emulsion was transferred into a 2 liter reaction kettle equipped with an overhead stirrer. The particle size of the solids of the emulsion at this point was about 35 nanometers. 31.3 Grams of the aqueous pigment cyan (Blue 15.3) dispersion (25.5 percent solid) together with 12 grams of citric acid were added, and the mixture was heated to 55° C. with stirring. While heating at 55° C., 6 grams of ZnO powder were added into the mixture over a time period of 6 hours. At the end of the aggregation, the particle size was measured to be 5.23 microns with a GSD of 1.16 and a smooth spherical morphology. The particles were then washed with DI (deionized) water twice and dried.

Collection of Product:

The above mixture was diluted with 500 milliliters of cold water, cooled to room temperature, about 25° C., filtered, washed with about 500 grams of water and dried using a freeze dryer, resulting in a cyan toner.

Yellow Toner Preparation:

188 Grams of the sulfonated polyester resin SPE-1 were dissipated in 600 grams of hot (60° C. to 70° C.) water. The resulting emulsion was transferred into a 2 liter reaction kettle equipped with an overhead stirrer. The particle size diameter of the resin in the emulsion at this point was about 35 nanometers. 81.1 Grams of the aqueous pigment yellow (PY74) dispersion (14.8 percent solid) together with 12 grams of citric acid were added and the mixture was heated to 55° C. with stirring. While heating at 55° C., 7 grams of ZnO powder were added into the mixture over a period time of 8 hours. At the end of the aggregation, the particle size was measured to be 5.61 microns with a GSD of 1.17 and a smooth spherical morphology. The particles were then washed with DI (deionized) water twice and dried.

Collection of Product:

The above mixture was diluted with 500 milliliters of cold water cooled to room temperature, about 25° C., filtered, washed with about 500 grams of water, and dried using a freeze dryer, resulting in a yellow toner.

Magenta Toner Preparation:

190 Grams of the sulfonated polyester resin SPE-1 was dissipated in 760 grams of hot (60° C. to 70° C.) water. The resulting emulsion was transferred into a 2 liter reaction kettle equipped with an overhead stirrer. The particle size of the solids of the emulsion was about 35 nanometers. 93.9 Grams of the aqueous pigment red (PR81.3) dispersion (18.1 percent solid) together with 13 grams of citric acid were added and the mixture-were heated to 55° C. with stirring. While heating at 55° C., 7.5 grams of ZnO powder were added into the mixture over a period time of 8 hours. At the end of the aggregation, the toner particle size was measured to be 5.72 microns with a GSD of 1.16, and the toner possessed a smooth spherical morphology. The particles were then washed with DI (deionized) water twice and dried.

Collection of Product:

The above mixture was diluted with 500 milliliters of cold water cooled to room temperature, about 25° C., filtered, washed with about 500 grams of water, and dried using a freeze dryer, resulting in a magenta toner comprised of about 90 percent of polyester resin and about 10 percent of the above magenta pigment.

Black Toner Preparation:

190 Grams of the sulfonated polyester resin SPE-1 was dissipated in 600 grams of hot (60° C. to 70° C.) water. The resulting emulsion was transferred into a 2 liter reaction kettle equipped with an overhead stirrer. The particle size of the solids of the emulsion was about 35 nanometers. 45.5 Grams of an aqueous pigment black (REGAL® 330) dispersion (22 percent solid) together with 11 grams of citric acid were added, and the mixture was heated to 55° C. with stirring. While heating at 55° C., 6.5 grams of ZnO powder were added to the mixture over a period time of 8 hours. At the end of the aggregation, the particle size was measured to be 5.84 microns with a GSD of 1.18 and the toner possessed a smooth spherical morphology. The toner, which was comprised of 88 percent resin and 12 percent pigment, was then washed with DI (deionized) water twice and dried.

Collection of Product:

The above mixture was diluted with 500 milliliters of cold water cooled to room temperature, about 25° C., filtered, washed with about 500 grams of water and dried using a freeze dryer, resulting in the above product.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A process comprising:
   (i) providing or generating an emulsion latex comprised of sodio sulfonated polyester resin particles by heating said particles in water at a temperature of from about 65° C. to about 90° C.;
   (ii) adding with shearing to said latex (i) a colorant dispersion comprising from about 20 percent to about 50 percent of a predispersed colorant in water, followed by the addition of an organic or an inorganic acid;
   (iii) heating the resulting mixture at a temperature of from about 45° C. to about 65° C. followed by the addition of a water insoluble metal salt or a water insoluble metal oxide thereby releasing metal ions and permitting aggregation and coalescence, optionally resulting in toner particles of from about 2 to about 25 microns in volume average diameter; and optionally
   (iv) cooling the mixture and isolating the product.

2. A process in accordance with claim 1 wherein the insoluble metal salt is added to the blend of the emulsion, colorant, and acid to initiate the formation of metal salts which act as coagulating agents at the aggregating and coalescence temperature.

3. A process in accordance with claim 1 wherein simultaneous aggregation and coalescence is accomplished.

4. A process in accordance with claim 3 wherein the aggregation and coalescence temperature is from about 50° C. to about 65° C.

5. A process in accordance with claim 1 wherein the insoluble metal salt or metal oxide is $MgCO_3$, $SrCO_3$, $MnCO_3$, $CaCO_3$, $BaCo_3$, $ZnCO_3$, $MgC_2O_4$, $CoC_2O_4$, $CaC_2O_4$, $ZnC_2O_4$, and insoluble oxides such as ZnO, $Mn_2O$, $Bi_2O_3$ or $Mn_2O$, $Ce_2O_3$, $B_2O_3$ and $Ce_2O_3$.

6. A process in accordance with claim 1 wherein the inorganic acid is selected from a group of hydrochloric acid, nitric acid, sulfuric acid, and phosphoric acid, and the organic acid is selected from the group consisting of citric acid, and acetic acid.

7. A process in accordance with claim 1 wherein the concentration of the metal ions, which ions function primarily as a flocculating agent, is from about 0.5 to about 10 percent by weight, or from about 1 to about 7.5 percent by weight of the amount of the polyester resin.

8. A process in accordance with claim 1 wherein the addition of said insoluble metal salt or metal oxide results in finely dispersed particles in the emulsion/colorant mixture of (iv), and wherein said particles react with said acid forming a metal ion which metal ion functions as a coagulant.

9. A process in accordance with claim 8 wherein the flocculating metal ion is released in a controlled manner during said process at elevated temperatures of about 50° C. to about 65° C.

10. A process in accordance with claim 9 wherein the controlled release of the flocculating metal ions allows for an increase in the reactor throughput of from about 12 to about 22 percent.

11. A process in accordance with claim 1 wherein the particle size distribution of the aggregated particles is about 1.40 decreasing to about 1.15, when the temperature is increased from room temperature, about 25° C. to about 55° C.

12. A process in accordance with claim 1 wherein said shearing is accomplished by homogenizing at from about 1,000 revolutions per minute to about 10,000 revolutions per minute, at a temperature of from about 25° C. to about 35° C., and for a duration of from about 1 minute to about 120 minutes.

13. A process in accordance with claim 1 wherein the polyester of (i) is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylene sodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate).

14. A process in accordance with claim 2 wherein the polyester of (i) is a polyester of poly(1,2-propylene-sodio 5-sulfoisophthalate), poly(neopentylene-sodio 5-sulfoisophthalate), poly(diethylene-sodio 5-sulfoisophthalate), copoly-(1,2-propylene-sodio 5-sulfoisophthalate)-copoly-(1,2-propylene-terephthalatephthalate), copoly-(1,2-propylene-diethylenesodio 5-sulfoisophthalate)-copoly-(1,2-propylene-diethylene-terephthalatephthalate), copoly-(ethylene-neopentylene-sodio 5-sulfoisophthalate)-copoly-(ethylene-neopentylene-terephthalate-phthalate), or copoly-(propoxylated bisphenol A)-copoly-(propoxylated bisphenol A-sodio 5-sulfoisophthalate).

15. A process in accordance with claim 1 wherein the colorant is carbon black, magnetite, cyan, yellow, magenta, or mixtures thereof.

16. A process in accordance with claim 1 wherein the product isolated is comprised of toner particles isolated from about 2 to about 15 microns in volume average diameter, and the geometric size distribution thereof is from about 1.15 to about 1.35.

17. A process in accordance with claim 1 wherein said product is a toner and there is added to the surface of said toners metal salts, metal salts of fatty acids, silicas, metal oxides, or mixtures thereof each in an amount of from about 0.1 to about 10 weight percent of the obtained toner.

18. A process in accordance with claim 1 wherein the product is a toner obtained after cooling of from about 3 to about 15 microns in volume average diameter, and the geometric size distribution thereof is from about 1.15 to about 1.25.

19. A substantially surfactant free process for the preparation of toner comprising admixing an emulsion latex comprised of sodio sulfonated polyester resin particles of equal or less than about 0.1 micron in diameter size by heating said resin in water at a temperature of from about 15° C. to about 30° C. above the resin glass transition temperature with a colorant dispersion containing from about 20 to about 50 percent of predispersed colorant in water, which colorant possesses a mean colorant diameter size of from about 50 to about 150 nanometers, followed by the addition of an inorganic or an organic acid, heating the resulting mixture at a temperature of from about 35° C. to about 65° C. and followed by the addition of an insoluble metal salt or metal oxide in the presence of said acid resulting in a reaction of said salt or oxide to form metal ions, which ions function as coagulating agents, thereby simultaneously causing aggregation and coalescence; and (v) cooling the mixture.

20. A process in accordance with claim 19 wherein there is prepared an emulsion latex comprised of the sodio sulfonated polyester resin particles by heating said resin in water, and subsequent to cooling the toner is isolated and then dried.

21. A process in accordance with claim 20 wherein isolation is by filtration and cooling is to about 25° C.

22. A process in accordance with claim 1 wherein subsequent to (iv) the toner compositions or particles formed resulting are (v) cooled to about 25° C., followed by washing and drying.

23. A process in accordance with claim 1 wherein an organic acid is selected.

24. A process in accordance with claim 1 wherein an iinorganic acid is selected.

25. A process in accordance with claim 1 wherein a metal oxide is selected.

26. A process in accordance with claim 1 wherein a substantially water soluble metal salt is selected.

27. A process in accordance with claim 1 wherein the oxide is zinc oxide or magnesium oxide, and the ions are zinc two or magnesium two.

28. A process comprising blending an emulsion latex with a colorant dispersion in the presence of an organic acid; heating the resulting mixture; adding a metal salt, and optionally cooling and optionally isolating the product.

29. A process in accordance with claim 28 wherein the latex contains a sodium sulfonated polyester polymer or resin with a diameter volume average of from about 5 to about 300 nanometers, wherein said heating is from about 45° C. to about 65° C., wherein the metal salt reacts with said organic acid causing the release of metal ions, wherein cooling and isolating is accomplished, wherein the product is a toner, and wherein said organic acid is substantially insoluble in an organic solvent.

30. A process in accordance to claim 28 wherein the blending and heating is accomplished in a reactor, and wherein reactor fouling is minimized.

* * * * *